(12) United States Patent
Liebowitz

(10) Patent No.: US 7,924,657 B2
(45) Date of Patent: Apr. 12, 2011

(54) APPARATUS AND METHOD FOR TIME MANAGEMENT AND INSTRUCTION

(76) Inventor: Daniel Liebowitz, Marietta, GA (US)

( * ) Notice: Subject to any disclaimer, the term of this patent is extended or adjusted under 35 U.S.C. 154(b) by 0 days.

(21) Appl. No.: 11/744,145

(22) Filed: May 3, 2007

(65) Prior Publication Data

US 2007/0287140 A1 Dec. 13, 2007

Related U.S. Application Data

(60) Provisional application No. 60/746,345, filed on May 3, 2006.

(51) Int. Cl.
*B42D 15/00* (2006.01)
(52) U.S. Cl. .............................. 368/327; 283/117; 283/2
(58) Field of Classification Search .................. 283/117, 283/2–4; 116/308; 434/304; 368/41, 223, 368/228, 10; 40/107
See application file for complete search history.

(56) References Cited

U.S. PATENT DOCUMENTS

| | | | | | |
|---|---|---|---|---|---|
| 289,167 | A | * | 11/1883 | Styles | 40/110 |
| 1,018,641 | A | * | 2/1912 | Strayer | 40/121 |
| 1,542,742 | A | * | 6/1925 | Stevenson | 40/115 |
| 1,548,772 | A | * | 8/1925 | Van Dyke | 368/28 |
| 1,837,707 | A | * | 12/1931 | Follows | 116/308 |
| 2,584,374 | A | * | 2/1952 | Wickstrom | 368/44 |
| 3,316,709 | A | * | 5/1967 | Edwards | 368/27 |
| 3,745,313 | A | * | 7/1973 | Spilhaus | 235/88 R |
| 3,763,648 | A | * | 10/1973 | Pakter et al. | 368/41 |
| 4,972,393 | A | * | 11/1990 | Sase et al. | 368/28 |
| 5,353,264 | A | * | 10/1994 | Corbin, III | 368/19 |
| 5,751,663 | A | * | 5/1998 | Johnson | 368/77 |
| 5,943,300 | A | * | 8/1999 | Johnson | 368/77 |
| 5,999,496 | A | * | 12/1999 | Chaut | 368/223 |
| 6,324,777 | B1 | * | 12/2001 | Ngan | 40/107 |
| 2002/0163858 | A1 | * | 11/2002 | Greenwood | 368/28 |
| 2005/0105397 | A1 | * | 5/2005 | Tuason | 368/21 |

OTHER PUBLICATIONS

DPI—dpi.nsw.gov.au/agriculture/livestock/beef/management/record-keeping-mgt; Dec. 20, 2004.*
OpenLearn—openlearn.open.ac.uk/file.php/3336/formats/print.htm; Sep. 16, 2009.*
Figure 44: Richmond, B. (1998) 'Closed loop thinking', The Systems Thinker, 9, (4), Pegasus Communications, Inc; 1998.*

* cited by examiner

*Primary Examiner* — Sean Kayes
(74) *Attorney, Agent, or Firm* — Crose Law LLC; Bradley D. Crose

(57) ABSTRACT

A cyclical or non-linear time management system and method of managing time, and a time and time management teaching system and method of teaching time and time management is disclosed. The system relates a user's schedule to an actual or imagined clock face to give the user a better perspective and understanding of the flow of events and tasks in the day, and relates intuitive concepts such as the transit of the sun to both the clock and the user's schedule. The system can be used to manage a user's time, taking advantage of the user's familiarity with telling time by an analog clock, and further can be used to educate a user about telling time drawing on the user's familiarity with a daily routine or schedule.

19 Claims, 16 Drawing Sheets

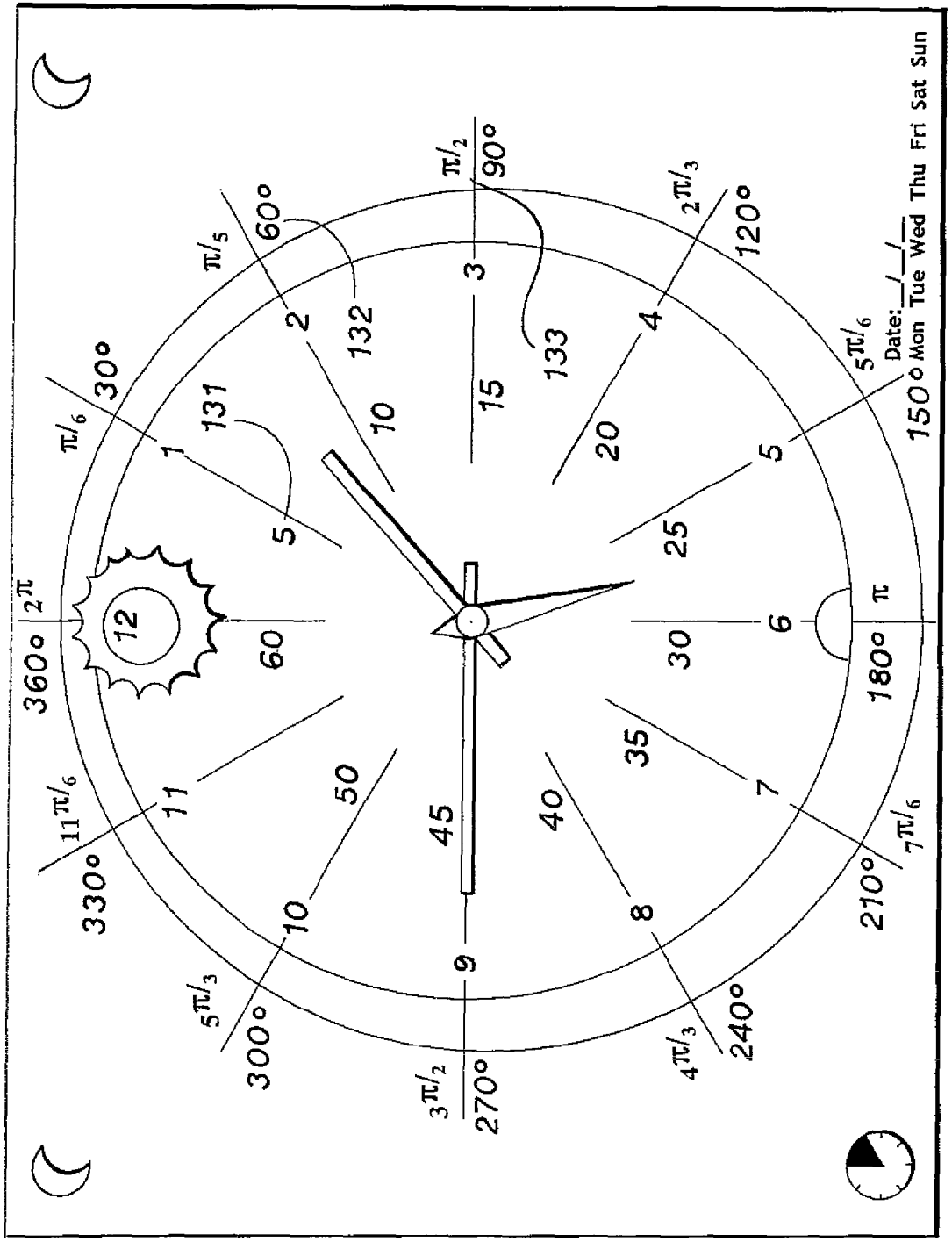

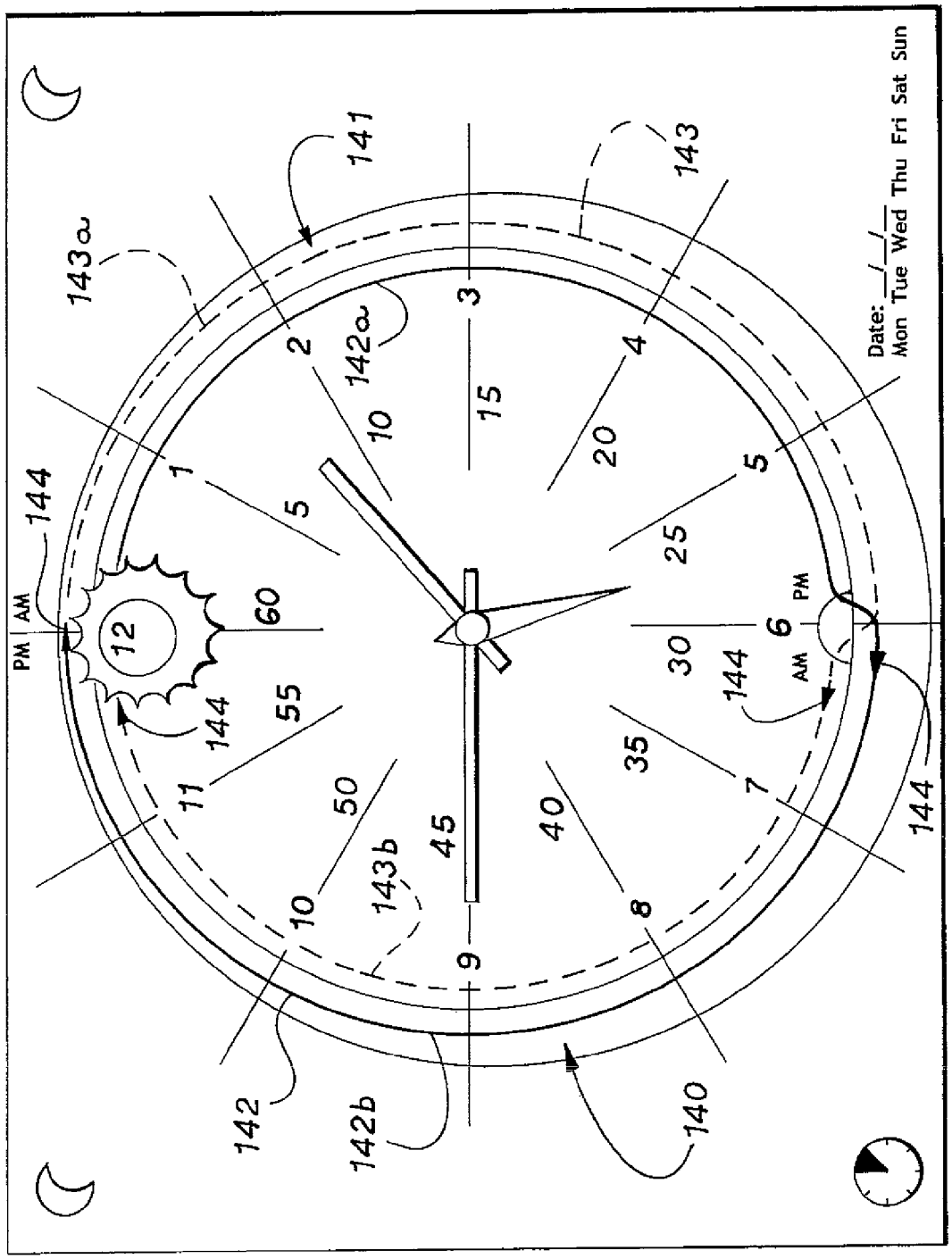

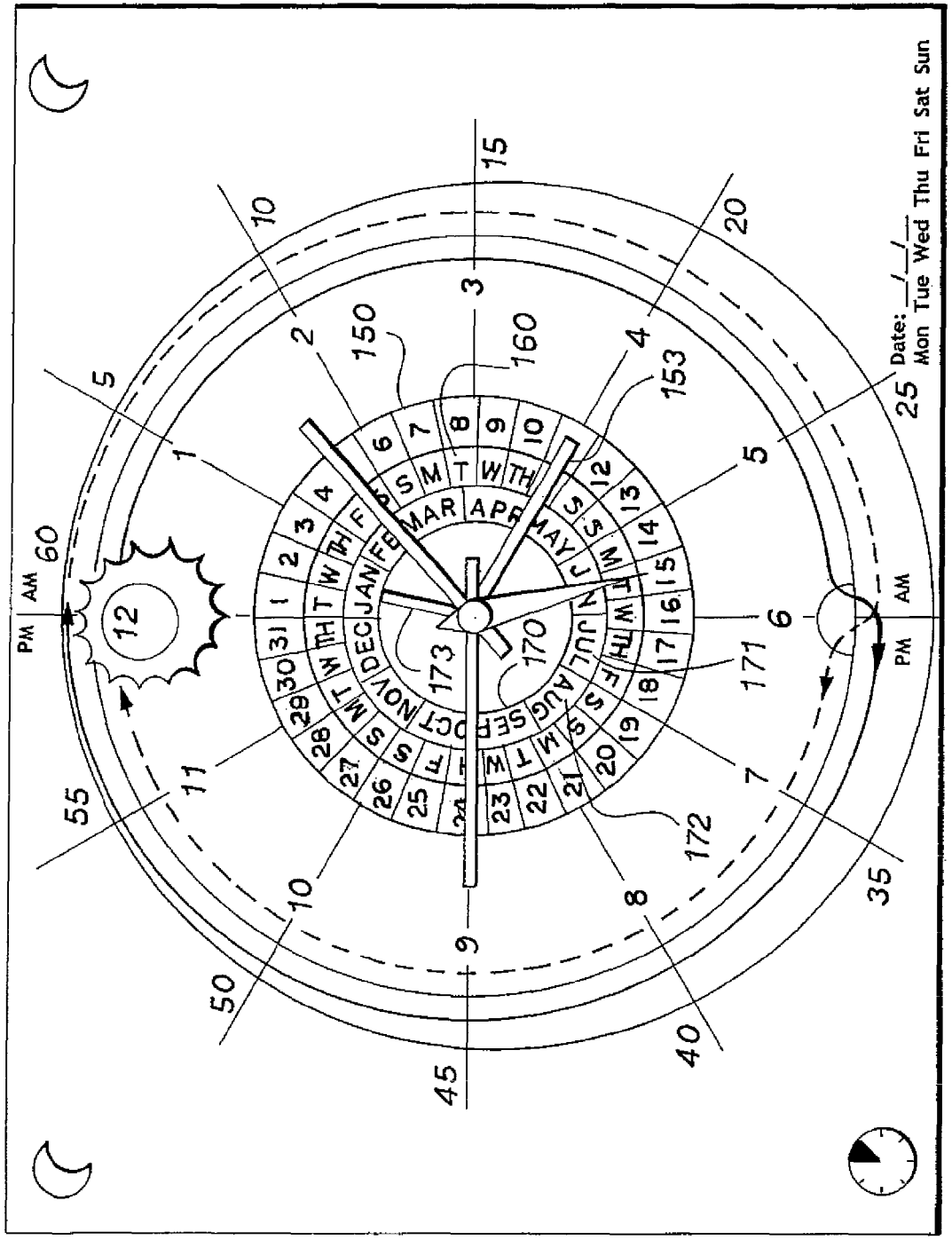

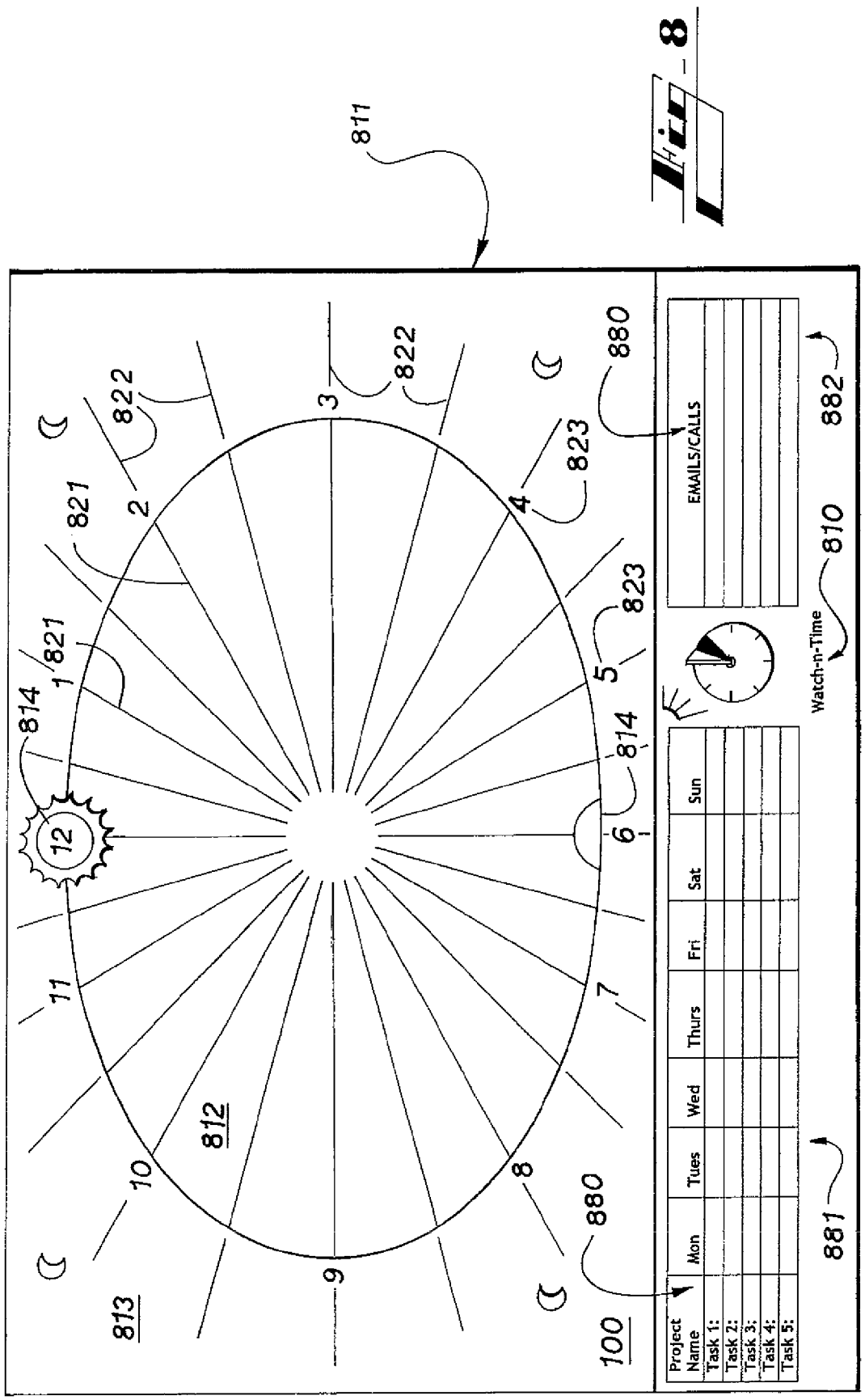

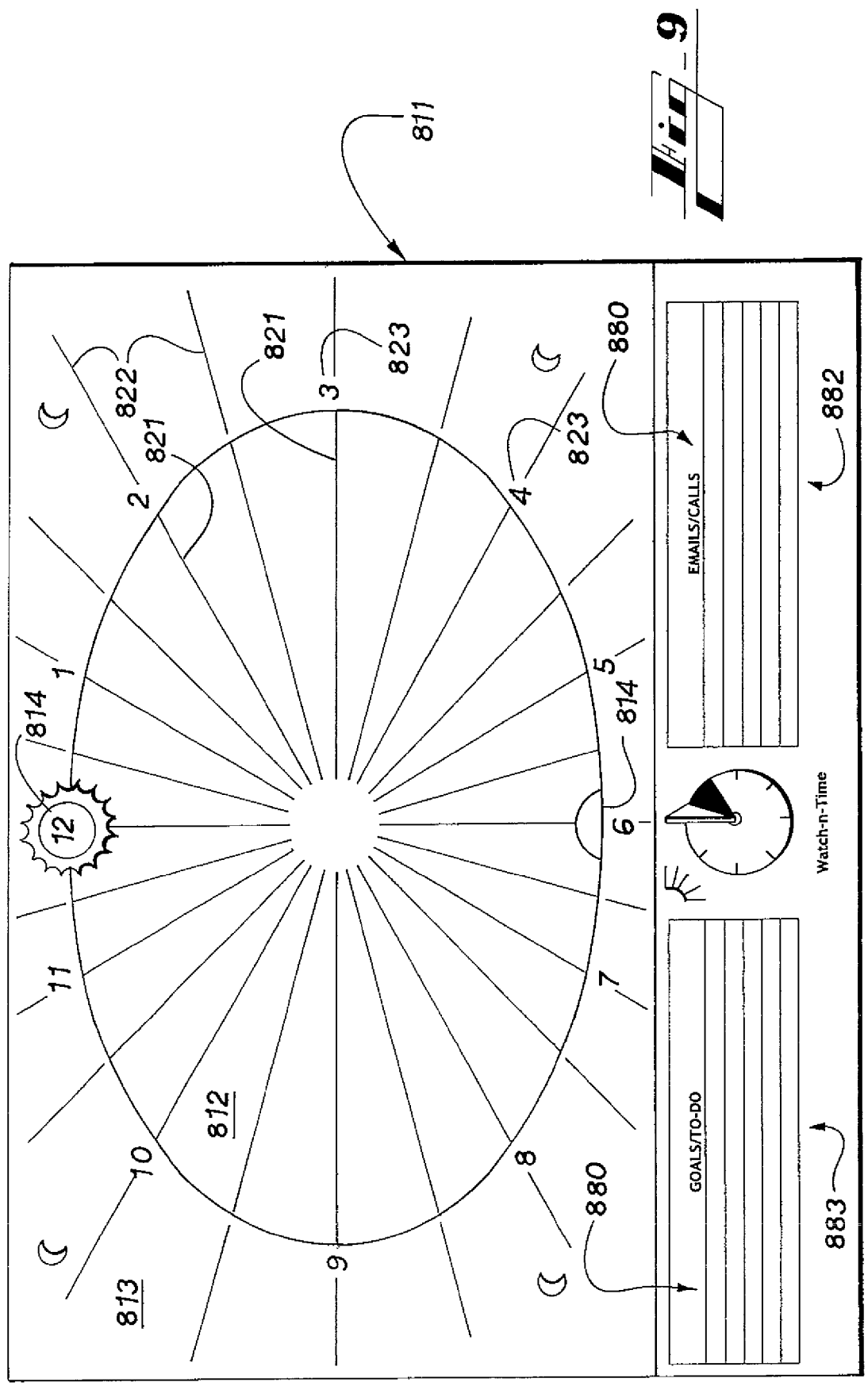

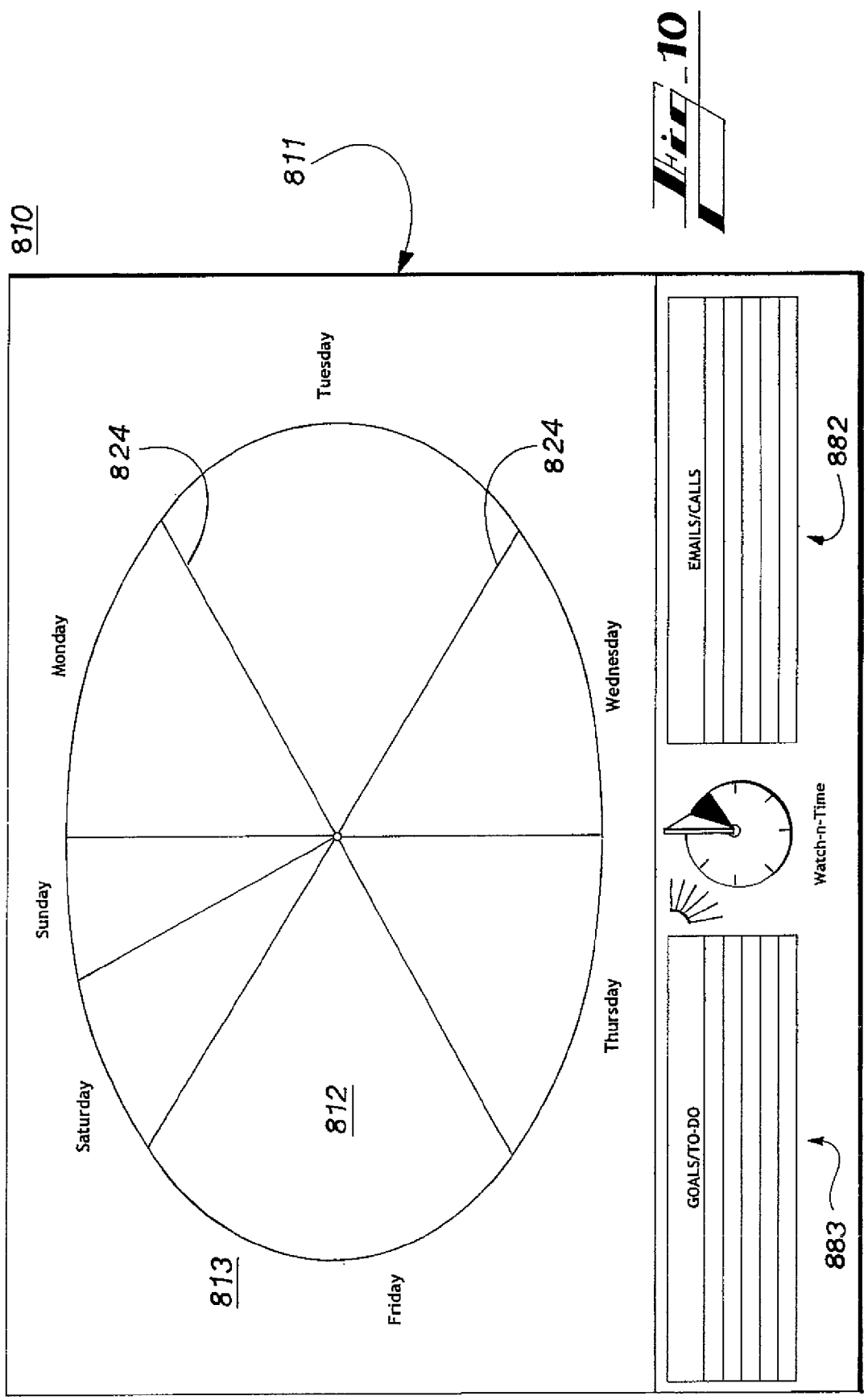

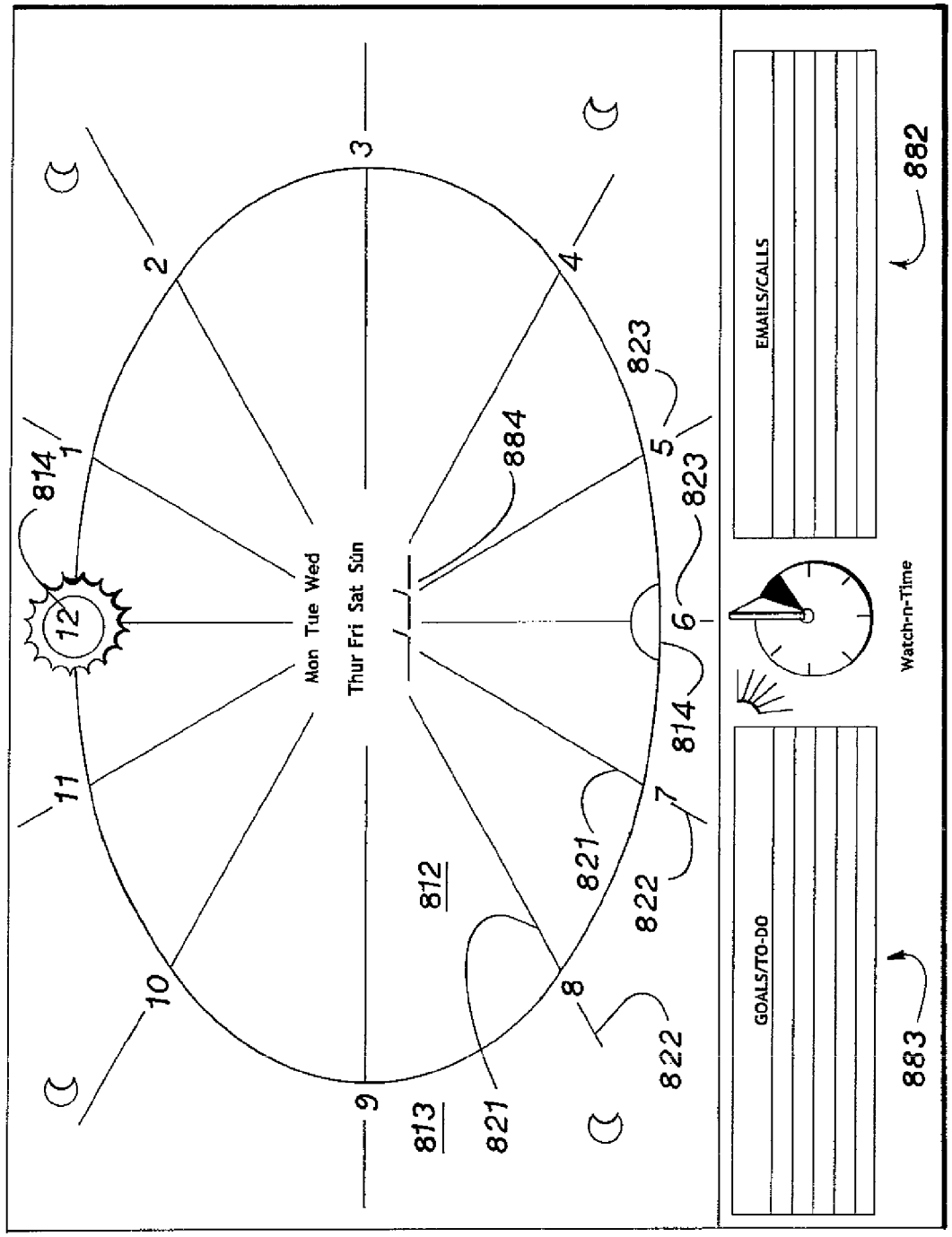

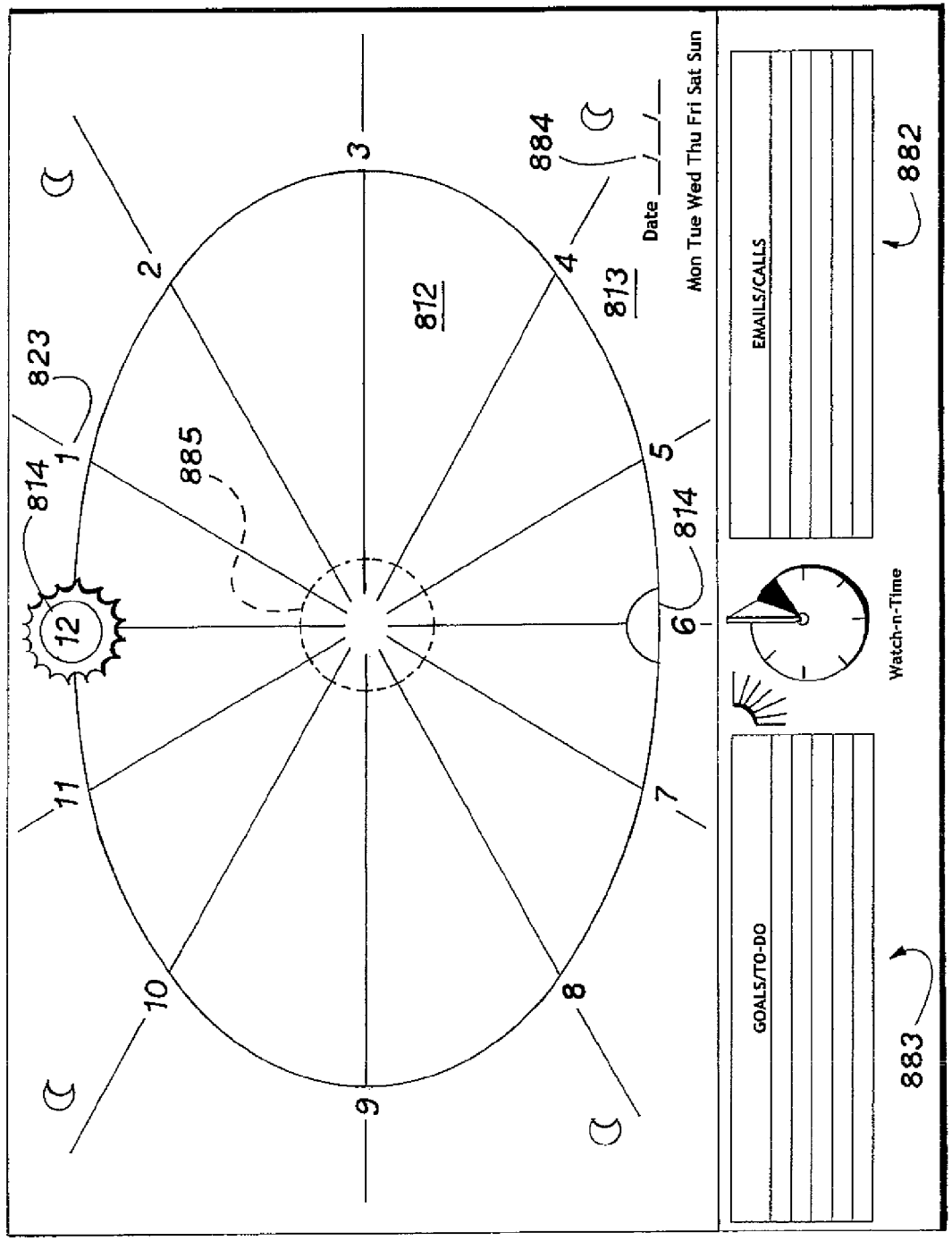

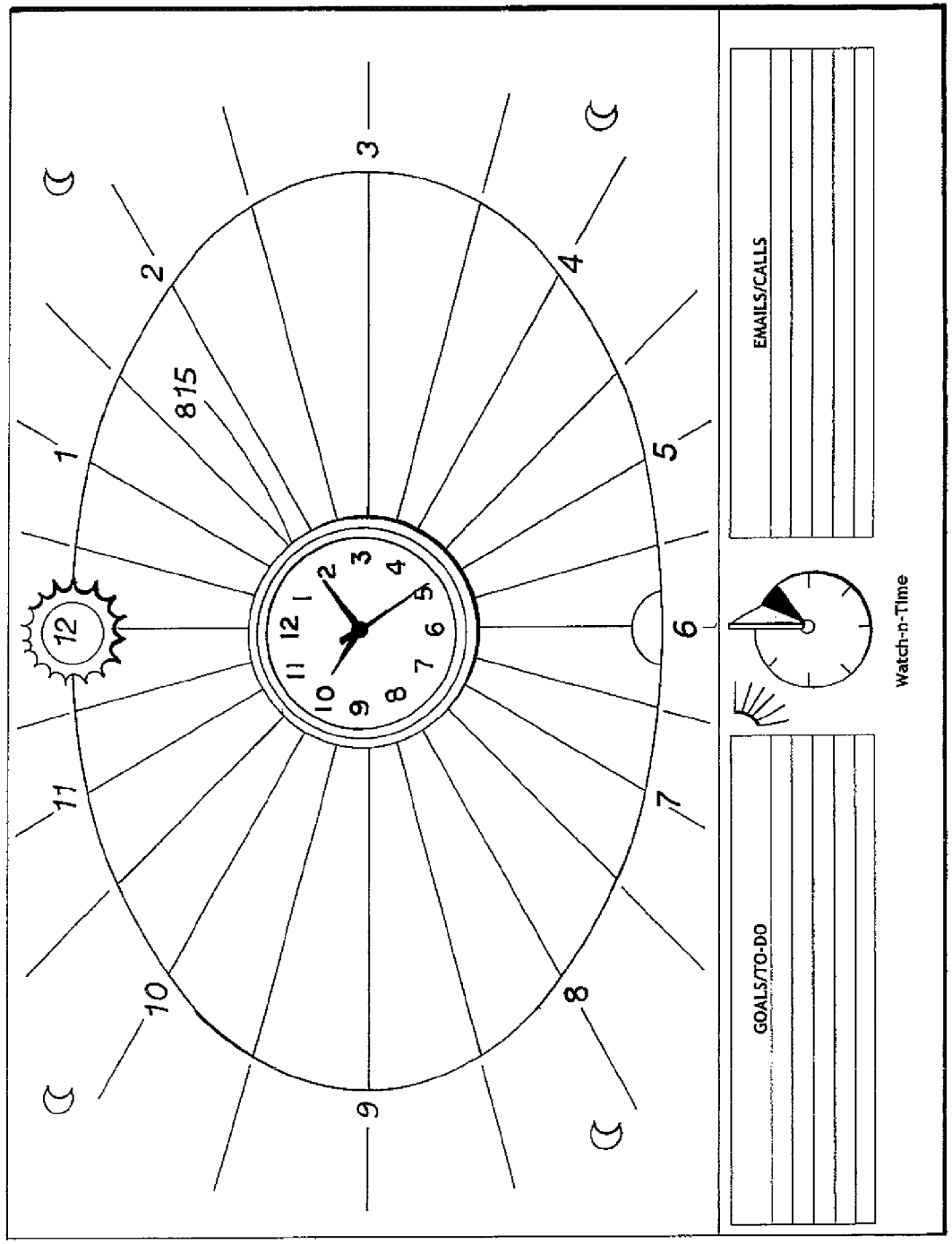

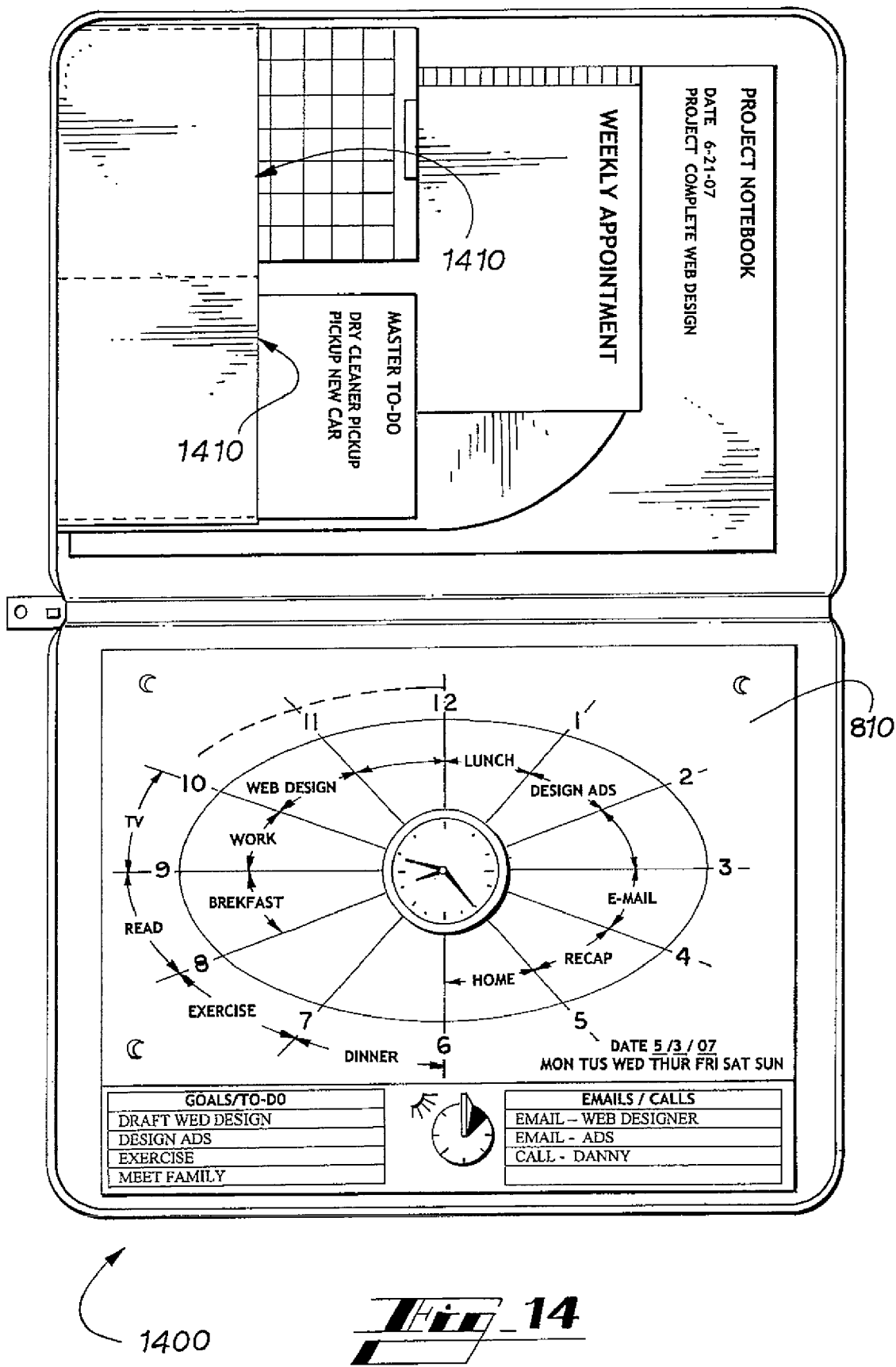
Fig_14

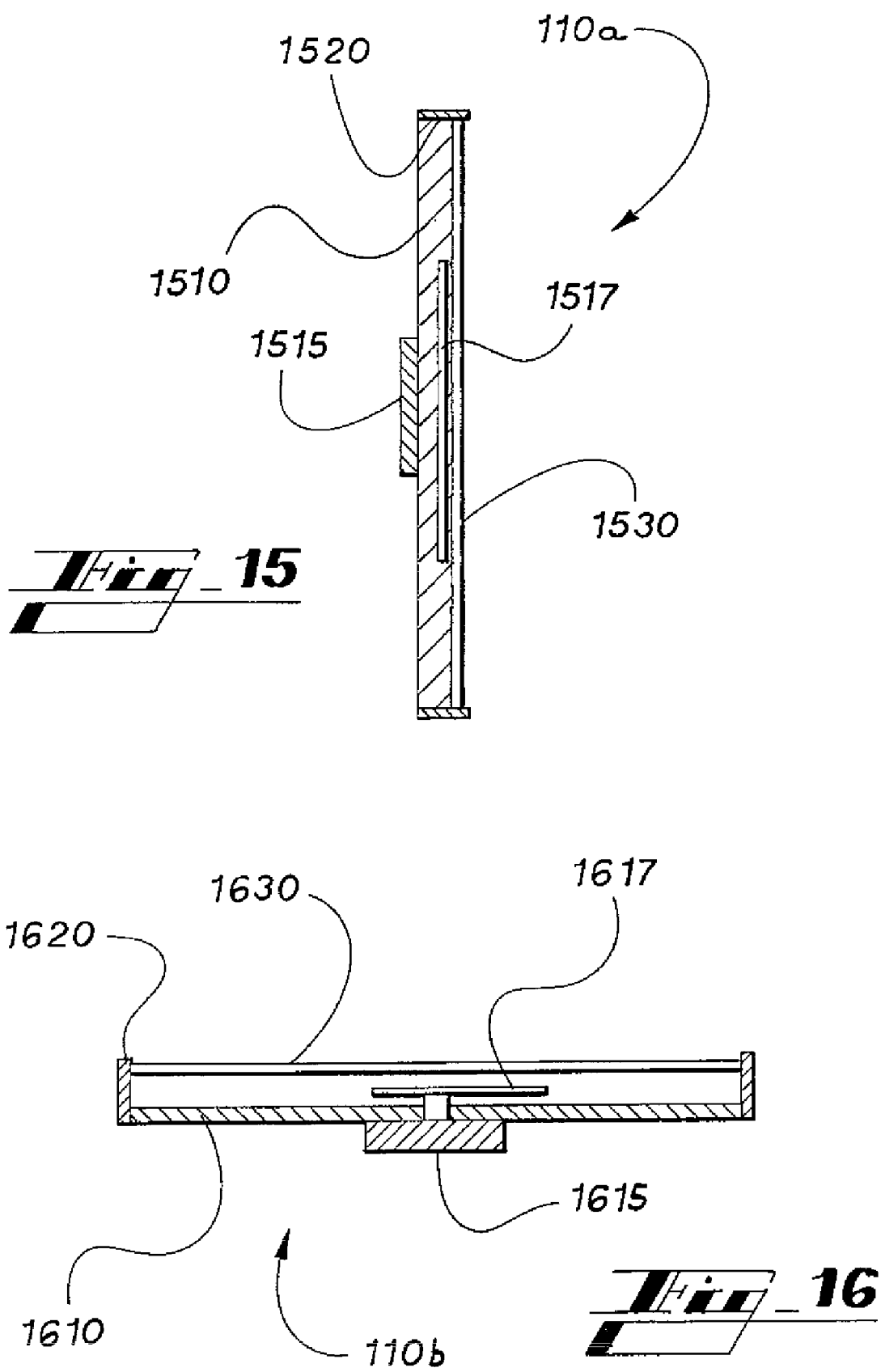

APPENDIX A
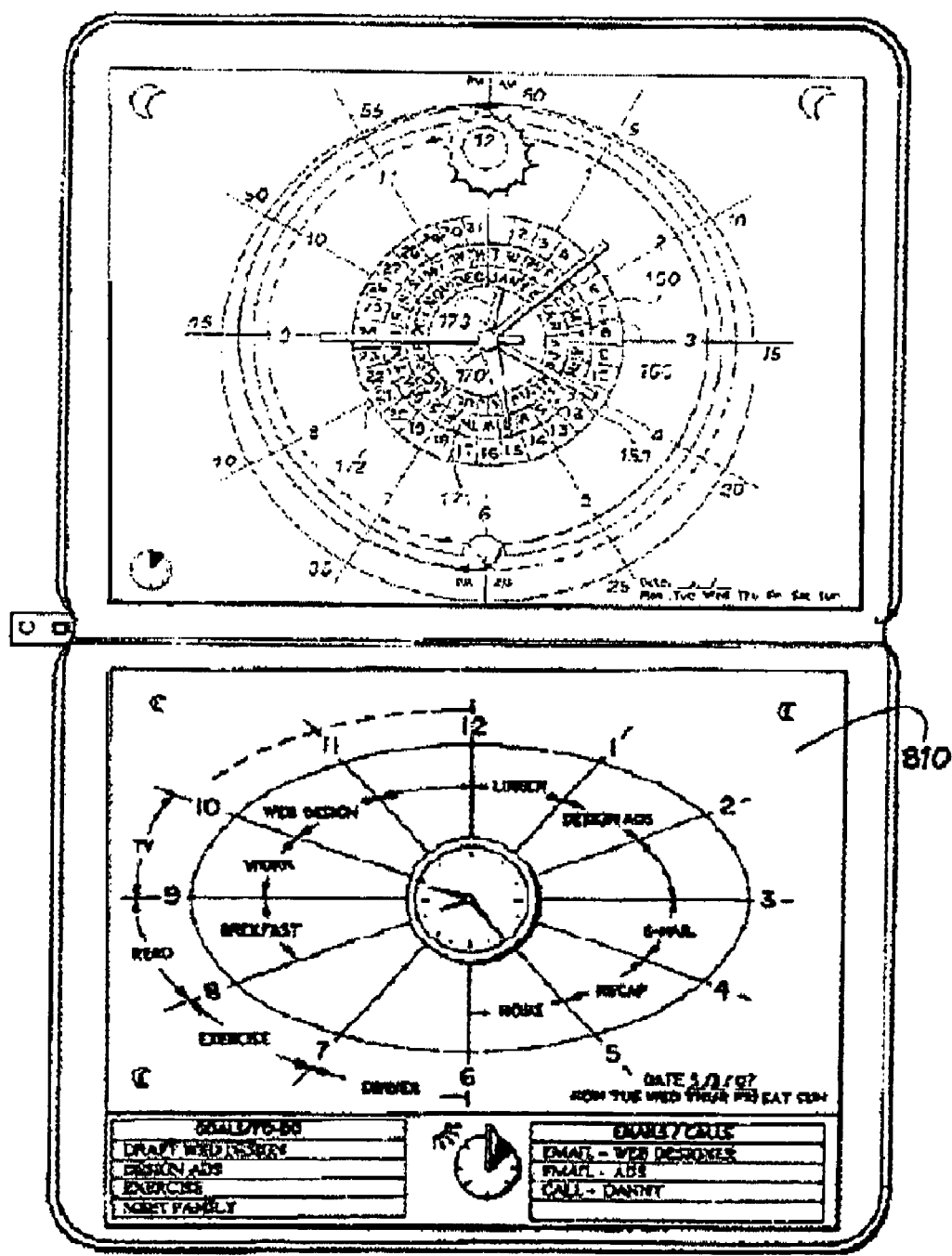
Fig_17

APPARATUS AND METHOD FOR TIME MANAGEMENT AND INSTRUCTION

PRIORITY CLAIM TO RELATED APPLICATIONS

To the fullest extent permitted by law, the present United States Non-provisional Utility Patent Application claims priority to, and the full benefit of, U.S. Provisional Patent Application having assigned Ser. No. 60/746,345, filed May 3, 2006, on behalf of Daniel Liebowitz, entitled "Watch-n-Time™ Day Planner System and Method of Use Thereof," incorporated herein by reference.

TECHNICAL FIELD

The present invention relates generally to time management and instruction, and more specifically, to a non-linear time management and instruction system and method.

BACKGROUND OF THE INVENTION

Very early in modern history, people began marking time so that they could mark the change of the seasons, the ebb and flow of the tides, and, generally, the time of day. Such marking was done by way of the sun dial, which made use of the natural cyclic rotation of the Earth. Later, the sun dial was modified to take the form of a clock face, but retained the cyclical nature of the sun dial. Thus, with merely a glance, a user could appreciate where in course of the day he was, and could, thus, plan accordingly.

Beginning at least as early as the industrial revolution, time has been viewed as a valuable commodity, and society has strived for ever-increasing efficiency. As such, individuals find themselves monitoring, recording, and scheduling their time down to the minute in the hope of getting more done in the same amount of time. Planners, schedulers, and organizers of various kinds have been developed in an effort to meet the needs of people trying to increase their time efficiency.

Such tools, however, are linearly oriented, appealing to individuals taught, or naturally disposed, to think linearly. Such linear orientation of these planning and scheduling tools causes users thereof to lose sight of the cyclical nature of time, and thus, lose perspective of their day. Users, thus, tend to over-plan, and become frustrated when they are unable to accomplish the tasks they have scheduled for the work day, such as from 8 AM to 6 PM, a representative block of time presented in planning tools.

Additionally, such planning tools are principally focused upon the day time hours, leaving evening/night time hours underrepresented, understated, or completely omitted. Planning tools for post-business hour activities, such as family time, personal business activities, post-work day professional business activities, organizational time, homework time, commute time, personal development time, interpersonal time, and the like, are virtually non-existent, often leaving such activities to chance occurrence and/or disorder.

Similarly, for those who may work late into the evening hours or at night, a planning system to eloquently address their needs is virtually non-existent.

Further, the teaching and learning of time, time planning, time-based organizational skills, and the like, may be difficult, especially with very young children and persons with certain kinds of mental, conceptual, or learning disabilities. There does not appear to be a teaching method and system that adequately and conveniently addresses teaching and understanding of the cyclical nature of time, from hour-to-hour, daytime-to-nighttime, day-to-day, and the like. Nor does there appear to be a teaching method and system that adequately, conveniently, and holistically addresses the concepts of time planning and organization according to a cyclically-based, rather than a linearly-based, arrangement.

Thus, there is a clear need for an organizational and teaching tool, system, and method that provides a user thereof with a more complete view of his or her time, that allows the user to see and understand an entire day's worth of time, and all of the activities planned for that day, and that is conveniently extensible into greater or lesser increments of time.

BRIEF SUMMARY OF THE INVENTION

Briefly described, in a preferred embodiment, the present invention overcomes the above-mentioned disadvantages and meets the recognized need for such a tool by providing an apparatus for managing time including a planning surface representing an entire day. The planning surface preferably has sections corresponding to natural divisions of the day, such as AM and PM and/or day and night, as well as further divisions for facilitating scheduling, such as hourly divisions, half-hourly divisions, or the like. Thus, a user may preferably appreciate an entire day's time by looking at the planning surface, whereby the user can see the entire day from early in the morning, through business hours, into the evening, and up to late at night. Events and tasks are preferably marked on the surface, such as by writing or drawing, and a clock is preferably included with, or nearby, the planning surface to orient the user when looking at the scheduled events and/or tasks.

According to its major aspects and broadly stated, the present invention, in its preferred form, is a time-management device comprising a planning surface having a 720° closed-loop path formed thereon. Events and tasks may be scheduled for the day by marking the planning surface.

More specifically, in one selected embodiment, the invention takes the form of a dry-erase board, preferably including a planning surface with areas corresponding to at least one day. A clock is preferably included generally centrally in association with the board to provide a user with an indication of the current time for facilitating use of the planning surface. Preferably, the planning surface includes two generally concentric rings disposed about the center of the clock, the first ring representing day time, and the second ring representing night time. Thus, as an hour hand of the clock proceeds through two full rotations around the dial, i.e. 720° of rotation, it preferably marks out the entire day, such as by pointing to a section of the planning surface corresponding to that hour of the day, thereby indicating the appropriate task or event to be conducted. In this way, the device takes advantage of the user's familiarity with a clock face to aid the user in planning and organizing his or her day.

According to another aspect of the preferred embodiment, the first ring is colored differently from the second ring, such as yellow for the first ring and blue for the second ring. Such coloring preferably indicates to a user that the first ring represents 12 hours of day time, and that the second ring represents 12 hours of night time, whereby a user can view and appreciate all 24 hours of a day, and the events and tasks scheduled for that day by being marked in an area of the surface corresponding to a time when the event and/or task is scheduled. Furthermore, such complete depiction of a day will preferably remind the user that his or her day consists of more than just traditional business hours, and that important events and/or tasks occur outside of business hours; thereby, facilitating a more realistic, complete, and/or more creative schedule for the user's day.

According to another aspect of the preferred embodiment, each of the first and second rings preferably includes markings representing the hours of the day, whereby the user can easily schedule an event or a task by marking the appropriate portion of the planning surface with the event or task. Thus, free time is readily apparent to the user, as are scheduling conflicts.

According to another aspect of the preferred embodiment, one or more of the rings is preferably formed as an oval, with the major axis thereof generally aligned with the position of the 9 and the 3 of the clock face, whereby more space is dedicated to the hours of the morning and evening between 7 and 11 and between 1 and 5, respectively. Thus, less space is dedicated to the hours traditionally spent doing fewer tasks or events, such as the hours spent eating lunch and dinner, commuting, sleeping, and the like.

According to another aspect of the preferred embodiment, guide means are provided that assist a user in tracing the passage of time throughout the day along the path, as well as illustrating the transition from day to night and/or from AM to PM. The guide means preferably takes the form of one or more lines and/or arrows that traverse the 12 hours of day time in the first ring, and then move to the second ring where the lines and/or arrows traverse the 12 hours of night time, then moving back to the first ring to reach the beginning point. To differentiate between day time and night time and/or AM time and PM time, the lines and/or arrows may take a different form, such as a different color or a segmented form. Preferably the movement between rings takes place at the position of the 6 of the clock face, corresponding with a concept of sunrise and sunset. To that end, a depiction of a setting and/or rising sun may be included at the position of the 6 of the clock face. Similarly, a circle may be included at the position of the 12 of the clock face to represent a high-noon sun and/or the transit of the moon.

According to another aspect of the preferred embodiment, a third ring is included on the planning surface including 31 consecutively numbered segments corresponding to the days of the month. A fourth hand of the clock preferably sweeps through these segments marking the current day of the month. The fourth hand preferably automatically skips segments corresponding to days not present in certain months, such as days 29, 30, and 31 in February, not in a leap-year. Each segment is preferably formed of two sections corresponding to the day time and night time of each day.

According to another aspect of the preferred embodiment, an adjustable fourth ring is preferably included having 31 day identifiers in sequence therearound, e.g. the fourth ring preferably includes the sequence of letters M, T, W, TH, F, S, S, or the like, repeated therearound. The fourth ring is preferably arranged such that adjustment of the ring disposes the appropriate letter proximate the number of the day, such that the day of the week associated with any given day of the month is shown. When a new month is reached, the fourth ring is preferably adjusted, manually or automatically, such that the fourth ring indicates the correct days of the week for the new month.

According to another aspect of the preferred embodiment, a fifth ring is included having the months of the year listed therearound, for example with each month associated with a number of the clock face. A fifth hand of the clock may sweep around as the year progresses in order to indicate the correct month.

According to another aspect of the preferred embodiment, additional information is preferably provided proximate the numbers of the clock face. For example, the number of minutes (or decimal hours) associated with the positions of the numbers may be included, i.e. the number 5 proximate the 1, the number 10 proximate the 2, etc. Another option is to have a number of degrees from 12 included, i.e. 30° or Π/6 proximate the 1, 60° or Π/3 proximate the 2, etc. Yet another option is to have an angle from 12 included, i.e. 1/12 proximate the 1, 1/6 proximate the 2, etc.

In an alternative embodiment of the present invention, the planning surface is implemented on a pad of paper, each sheet of the pad preferably having the first ring and the second ring. The planning surface may additionally include guide means and/or additional information. The planning surface may additionally include a space for entering the day and/or the date. The pad preferably includes a central opening in which a clock may be installed, such that when the pad is fully consumed, the clock may be installed in a replacement or refill pad. The pad may be included in a binder having convenient pockets, and/or other articles, such as a ruler, a calculator, business cards, note paper, or the like. Alternatively, the pad may be included in a wall calendar, a desk blotter, or the like.

In another alternative embodiment, the planning surface may be implemented in a teaching tool, where the planning surface comprises a plurality of layers, such as cooperatively engageable layers or separate surfaces with differing combinations of layers. Preferably a first layer includes the first ring, the second ring, hands of a clock, and at least one of the depiction of the rising and the depiction of the setting sun. A second layer preferably adds the numbers of the clock face and dividers creating 12 sections of each ring, each section associated with one hour. A third layer preferably adds additional information, such as the number of minutes, angles, and/or fractions. A fourth layer preferably adds guide means, such as a closed-loop path tracing both the day time hours around the first disc and the night time hours around the second disc. A fifth layer preferably adds a third ring including the dates. A sixth layer preferably adds the days of the week. A seventh layer preferably adds the months.

The various layers may preferably be installed or removed from the planning surface in order to customize the device, or to assist in teaching how the clock and/or calendar cycle works in a piecemeal fashion.

These and other embodiments, aspects, features and advantages of the present invention will become more apparent to those ordinarily skilled in the art after reading the following Detailed Description and Claims in light of the accompanying drawing Figures.

BRIEF DESCRIPTION OF THE DRAWINGS

Accordingly, the present invention will be understood best through consideration of, and reference to, the following Figures, viewed in conjunction with the Detailed Description of the Preferred Embodiment referring thereto, in which like reference numbers throughout the various Figures designate like structure and in which:

FIG. 3 is a plan view of the time management device of FIG. 2, showing an additional third layer;

FIG. 4 is a plan view of the time management device of FIG. 3, showing an additional fourth layer;

FIG. 7 is a plan view of the time management device of FIG. 6, showing an additional seventh layer;

FIG. 8 is a plan view of a time management device according to an alternative embodiment;

FIG. 9 is a plan view of a time management device according to an alternative embodiment;

FIG. 10 is a plan view of a time management device according to an alternative embodiment;

FIG. 11 is a plan view of a time management device according to an alternative embodiment;

FIG. 12 is a plan view of a time management device according to an alternative embodiment;

FIG. 13 is a plan view of a time management device according to an alternative embodiment;

FIG. 14 is a top view of a binder including the time management device of present invention;

FIG. 15 is a cross-sectional view of a time management device according to the present invention; and FIG. 16 is a cross-sectional view of an alternative time management device according to the present invention; and FIG. 17 is a top view of a binder including the time management device according to an alternative embodiment of present invention.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Figure 1:
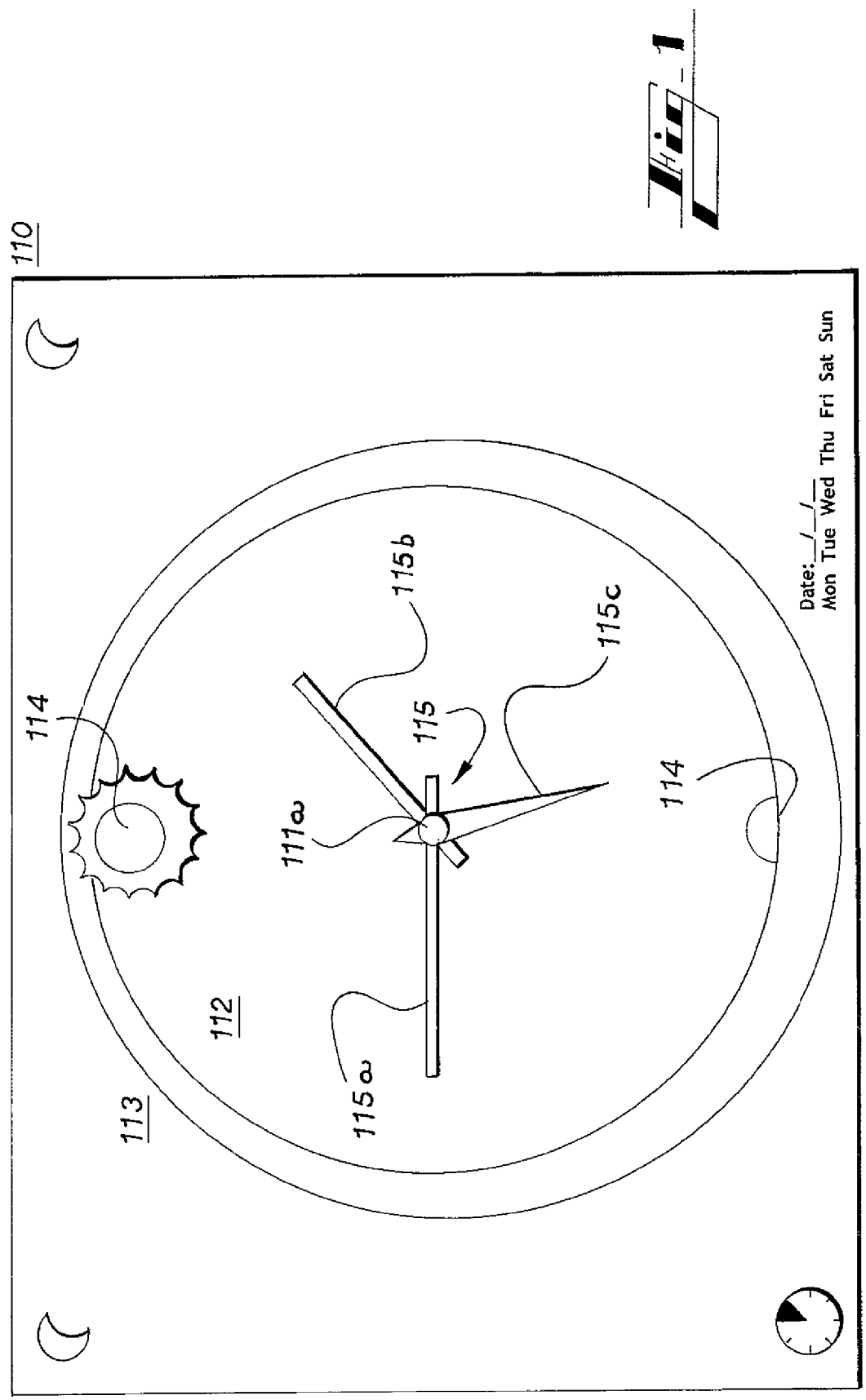
FIG. 1 is a plan view of a time management device according to the present invention showing a first layer.
Figure 2:
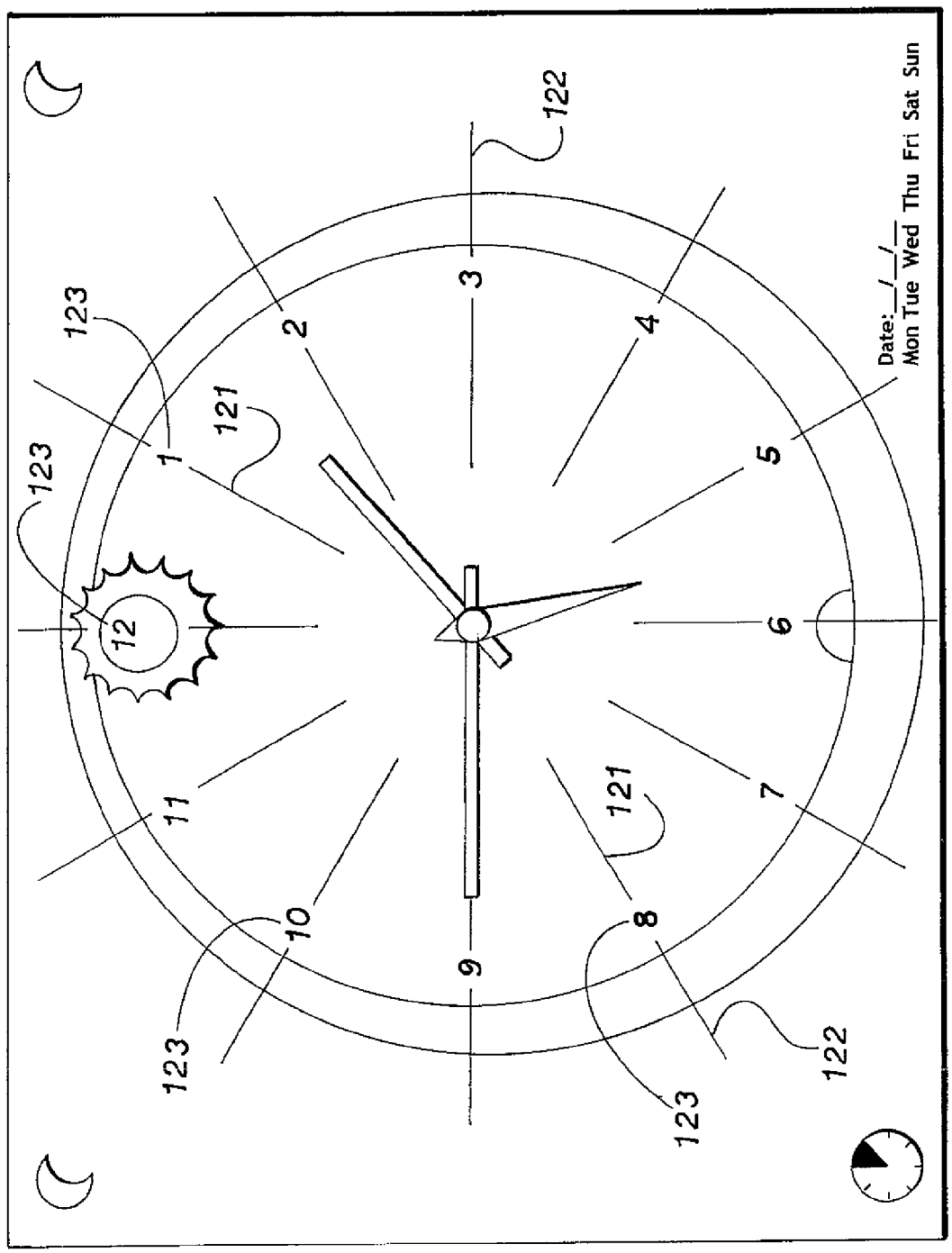
FIG. 2 is a plan view of the time management device of FIG, 1, showing an additional second layer.
Figure 5:
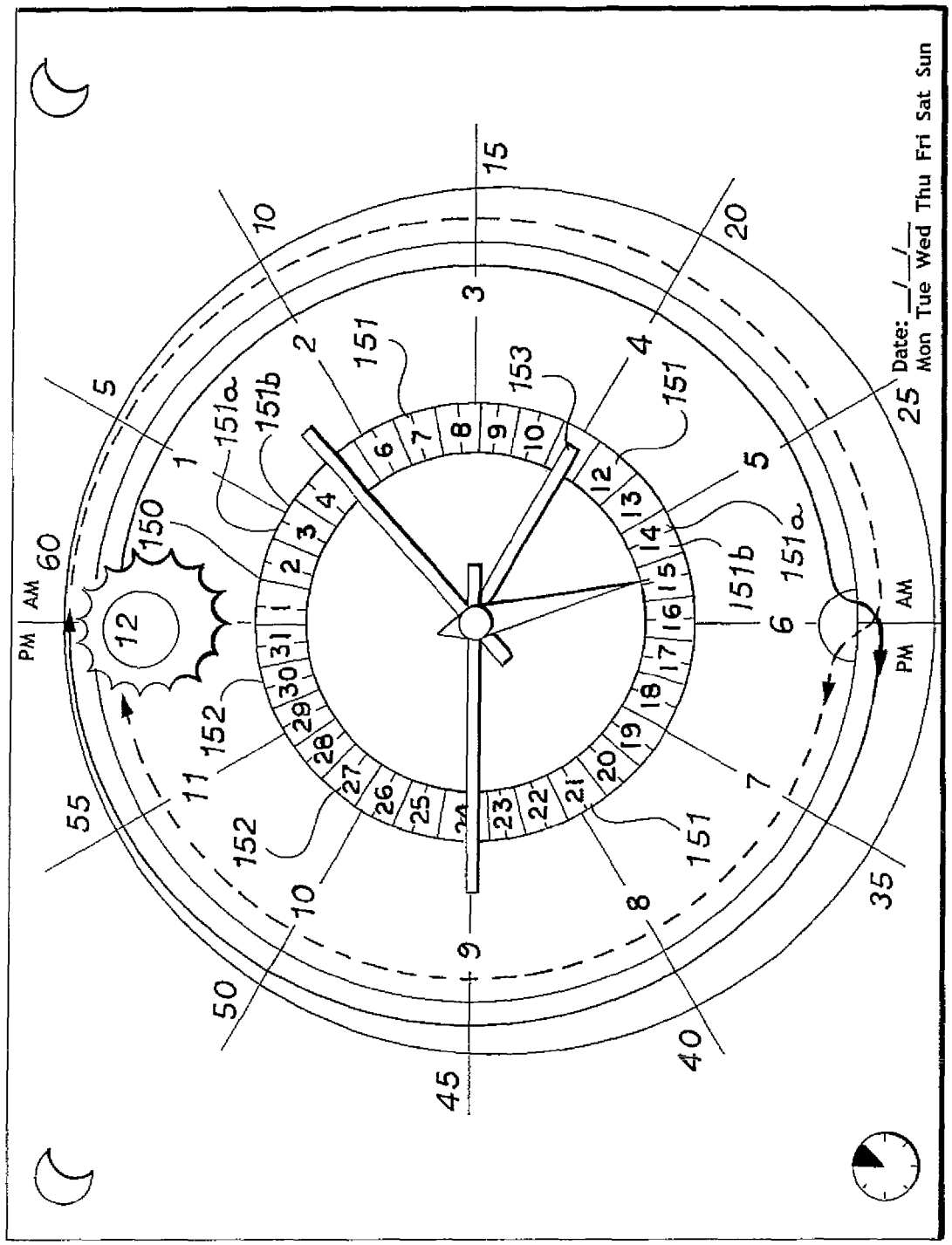
FIG. 5 is a plan view of the time management device of FIG. 4, showing an additional fifth layer.
Figure 6:
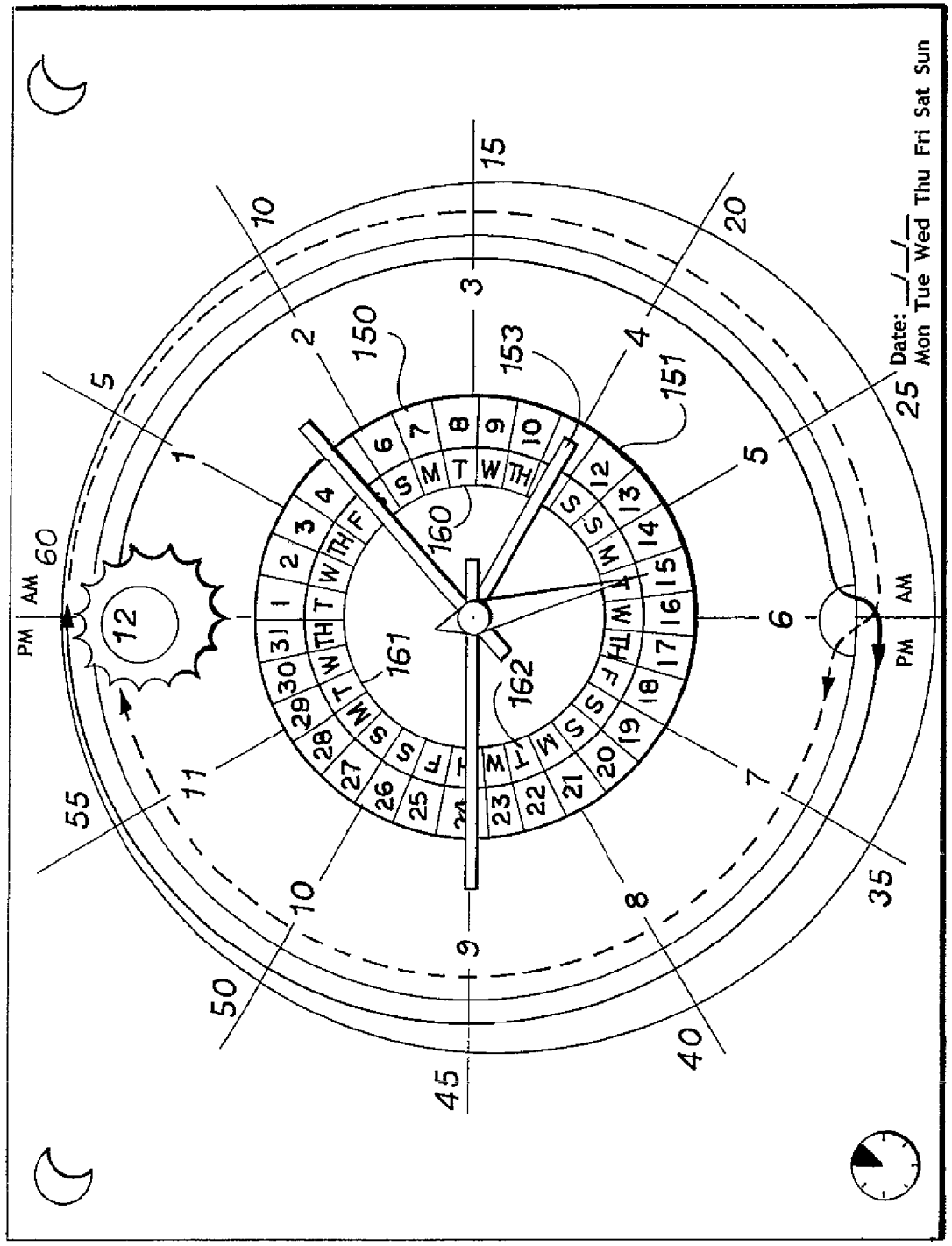
FIG. 6 is a plan view of the time management device of FIG. 5, showing an additional sixth layer.

In that form of the preferred embodiment of the present invention chosen for purposes of illustration, FIGS. 1-7 show time management device 100 preferably formed as dry-erase board 110. Dry erase board 110 preferably includes planning surface 111 on a front thereof. Display of planning surface 111 may be accomplished by attaching dry-erase board 110 to a wall, by placing dry erase board on an easel or other structure, or the like. Planning surface 111 preferably comprises first ring 112, such as in the form of a circle or an oval, disposed thereon generally concentrically with center 111a, and second ring 113 disposed generally concentrically with first ring 112. First ring 112 and second ring 113 preferably comprise a 720° closed-loop path tracing out two complete rotations about center 111a. First ring 112 and second ring 113 preferably include coloring, patterning, or the like to differentiate therebetween, such as yellow coloring for first ring 112 and blue coloring for second ring 113.

Planning surface 111 preferably further includes indicia 114, such as a setting sun and/or a noon day sun. Indicia 114 are preferably disposed proximate a position of the 12 and/or the 6 of a clock face and preferably take the form of representation of a rising, setting, or high-noon sun. Time management device 100 preferably further comprises clock 115 disposed centrally thereon. Clock 115 preferably includes second hand 115a, minute hand 115b, and hour hand 115c. As such clock 115 preferably indicates a correct time, and planning surface may be used to organize a user's event schedule or day's tasks, such as by writing or marking thereon. The hands of clock 115, especially hour hand 115c, preferably move continuously, but may alternatively move in discrete increments. The marking may preferably be accomplished by writing text describing and event or a task on a portion planning surface 111 corresponding to the scheduled time of the event or task using a dry-erase marker or other erasable marking means. The marking may additionally or alternatively be accomplished by drawing images, symbols, or icons relating to the event or task, by affixing stickers, magnetic or other icons, static cling films, clips, pegs, or the like.

To enhance the ability of dry-erase board 110 to facilitate organization and time management, planning surface 111 preferably further includes twelve day time dividers 121 such that one-hour increments of day time are easily discernable and such that a user can easily associate certain events and/or tasks with certain times of the day. Planning surface 111 preferably likewise includes twelve night time dividers 122 for similarly scheduling a user's evening and night hours. Although dividers are shown as hourly dividers, additional or alternative dividers, such as half-hourly dividers, or the like, may be included. Additionally, adjacent sections of first ring 112 and/or second ring 113 may preferably include varied, such as alternating coloring, shading, patterning, or the like, such as a bright yellow and a pale yellow alternating pattern for adjacent sections of first ring 112. Clock face numbers 123 are preferably arranged proximate respective ones of day time dividers 121 and night time dividers 122, such as proximate a boundary between first ring 112 and second ring 113 to facilitate association of each area of the closed-loop path with a respective time of the day, such as an hour thereof. As such, all twenty-four hours of the day are preferably represented by discrete sections of planning surface 111 for use in managing a user's time. Clock face numbers may take the form of the numbers 1-12 arranged about planning surface 111, or may, alternatively, take the form of the numbers 1-24 arranged about planning surface 111, such as for illustrating AM and PM and twenty-four hour time (i.e. military time), respectively.

Additional information 130 associated with respective clock face numbers 123 is preferably included on planning surface 111, such as minute numbers 131, degrees 132, and/or radians 133. For example, the following additional information may be included proximate the 1 of clock face numbers 123, "5" for the number of minutes associated therewith and/or "30°" and/or "Π/6" for the angle from the 12 of clock face numbers 123. Alternatively, different additional information may be included that may be of interest or of use to a user of dry-erase board 110, such as high and low tide information, sunrise and sunset times, decimal hour divisions, or the like.

Additionally, guide means 140 is preferably included on planning surface 111 to aid a user in tracing the path and tracking the hours of the day therearound. Guide means 140 is preferably formed as a 720° closed-loop path 141 comprising solid portion 142 associated with PM hours, and broken portion 143 associated with AM hours. Alternatively, broken portion 143 and solid portion 142 may be associated with different groups of hours, such as day time hours and night time hours. Preferably, first section 143a of broken portion 143 is disposed in second ring 113 and extends generally clockwise from the 12 to the 6 of clock face numbers 123. Second portion 143b of broken portion 143 traverses into first ring 112 and preferably extends generally clockwise from the 6 back to the 12 of clock face numbers 123. At the 12 of clock face numbers 123, and still in first ring 112, broken portion 143 meets first section 142a of solid portion 142. First section 142a preferably extends generally clockwise from the 12 to the 6 of clock face numbers 123, where it proceeds to traverse to second ring 113. Second section 142*b* of solid portion 142 preferably extends generally clockwise from the 6 to the 12 of clock face numbers 123, where it joins with first section 143*a* of broken portion 143, thus closing the loop. Arrows 144 may optionally be included to reinforce the guiding effect of guide means 140.

Third ring 150 is preferably included on planning surface 111, such as proximate first ring 112. Third ring 150 preferably includes thirty-one (31) divisions 151. Each division 151 preferably includes a unique date 152. Preferably, dates 152 comprise Arabic numerals in sequential order beginning with a section closest to the 12 of clock face numbers 123, and proceeding clockwise around third ring 150. Date hand 153 of clock 115 is preferably included to indicate the current date. Date hand preferably sweeps around planning surface in a clockwise direction, and preferably automatically skips dates not present in a given month. For example, date hand 153 preferably skips the 29, 30, and 31 dates at the end of February 28 in non-leap years. Additionally, each division 151 preferably includes two sections 151*a* and 151*b* associated with an AM time and a PM time of each date, or with a day time and a night time of each date.

Fourth ring 160 is preferably further included on planning surface 111, such as proximate third ring 150. Fourth ring 160 preferably comprises similar divisions 161 with an indication 162 of the day of the week therein, such as a repeated sequence of letters, such as "M", "T", "W", "F", "S", and "S". Fourth ring 160 is preferably adjustable to align the correct indication 162 of the day of the week with the correct date 152. Thus, date hand 153 preferably indicates not only the date, but also the day of the week.

Fifth ring 170 is preferably included on planning surface 111, such as proximate fourth ring 160 and preferably includes twelve (12) divisions 171. Each division preferably includes an indication 172 of the correct month. Month hand 173 of clock 115 preferably indicates the correct month.

Now referring to FIGS. 15-16, dry-erase board 110A may include planning surface 1510, clock 1515 connected thereto having hands 1517 disposed over planning surface 1510 and covered by transparent dry-erase surface 1530, bounded by frame 1520. As such, dry-erase board 110A may be attached to a wall via conventional hanging means, may rest on a supporting structure, such as an easel, a table top or the like, or may be otherwise displayed in a convenient location. One or more marking may be made on transparent dry-erase surface 1530 for use in managing a user's time, or in teaching time or time management to one or more individual. Additional transparent overlays may be removably attached to transparent dry-erase surface 1530 for adding additional elements thereto.

Dry-erase board 110B may include dry-erase planning surface 1610, clock 1615 connected thereto with hands 1617 disposed over planning surface 1610 and covered by transparent member 1630. Transparent member 1630 is preferably removably attached to frame 1620, whereby transparent cover 1630 may be removed to access clock hands 1617 and/or dry-erase planning surface 1610 lo in order to add, remove, or modify markings thereon.

In use as a scheduling or organizing device, time management devices 100, 800 preferably provide a surface for writing or other marking, such as drawing, attaching stickers or other notes, icons, or the like. Preferably, a user begins by marking, through written description, pictorial representation, or other sign or indication, a day's scheduled events and/or tasks. Such marking preferably comprises forming an indicia corresponding to a selected event and/or task on a portion of the planning surface corresponding to a time, or a block of time, when the selected event and/or task will, should, or may take place or be begun, worked on, or completed. The step of forming an indicia may comprise writing on, drawing on, and/or attaching an article to the planning surface. The step of marking is preferably repeated for additional events and/or tasks until the user no longer desires to mark an additional event and/or task.

The user may preferably then refer to a clock or other device for telling time, such as clock 115, to determine the current time. The user may then preferably refer to the space, section, or area on the planning surface corresponding to the current time to determine what event or task is scheduled for therefor, whereby the user may become aware of what event or task is scheduled for work or attendance at the present time, as desired. Additionally, and/or alternatively, the user may refer to one or more spaces of the planning surface corresponding to a later time, and earlier time, or both, whereby the user may become aware of tasks and/or events previously worked on, completed, or attended, as well as what task and/or events remain on the schedule for the remainder of the day or remain unaddressed from earlier in the day. When the user desires, such as at the end of the day, the user may remove some or all of the marks made on the planning surface. The user may then make new, additional, or alternative markings indicating new, old, or recurring events and/or tasks for reference thereto, preferably in an attempt to ensure completion thereof.

Additionally the user may adjust an indication of the month, the day of the week, the date, the phase of the moon, the season, or the like as necessary or desired, such as to keep or make such indication accurate to a correct current month, day of the week, date, etc. The user may also mark events and/or tasks corresponding to times, such as days, weeks, months, or the like that have passed or which have not yet come, such as for a reminder of the passing or imminence of the event and/or task. One example of such a use would involve marking a scheduled examination or deadline that is weeks or months in the future to provide a reminder thereof and/or marking an event, such as the date of a child's birth that has passed to remind the user of the child's age.

When the time management device takes the form of a pad, the same marking steps are preferably performed, whereby the user's schedule is laid out on the planning surface. The additional step of marking the current date, day of the week, month, year, season, etc., is preferably completed by the user in a pre-printed area for such marking, or the pad may comprise sheets with pre-marked date, day of the week, month, year, etc. Furthermore, the user mark additional information on the planning surface, preferably in areas dedicated for such marking, such as a telephone call and/or email marking area. The user may preferably mark entries relating to incoming, outgoing, missed, or other calls, emails, letters, visits, or the like. Preferably the user may additionally mark goals, to-do items, or other such items, such as weekly goals. Inspirational messages, images, icons, or the like may also be marked on the planning surface as desired by the user.

When the user desires, a sheet of the pad may be removed and disposed or archived, revealing a new planning surface of the pad, such as a planning surface dedicated to the next day. The user may select different planning surfaces for use with a given day, such as by using a first pad for weekdays, and a second pad for weekends, the first and second pads having different planning surfaces thereon. Alternatively, one pad may include different styles of planning surfaces for selected use, and such different styles of planning surfaces may be arranged within the pad according to a cycle of days of the week. For example, five sequential sheets of a first style may be included for weekday use, followed by two consecutive sheets of a second style for weekend use. Consideration may be given to individuals who have varying, unique, or non-traditional schedules, or schedules specialized to a particular profession or field of endeavor. Such considerations may allow a user to create a personalized, unique, or specialized pad having a desired sequence of sheets having planning surfaces of selected forms.

In use as a time teaching device, one or more routine events and/or tasks may preferably be marked on the planning surface at a location corresponding to a time when the routine event and/or task occurs. Thus, an individual or a group, such one or more young child, handicapped individual, or the like, who is unfamiliar with telling time via a clock face and hands, may preferably read or otherwise appreciate the marks and lo understand that the marks correspond to familiar events and/or tasks that comprise a familiar routine. Exemplary events and/or tasks include the teaching of various classroom subjects, recess, lunch, extra-curricular activities, or the like. The individualls) may then preferably draw on their familiarity with the events and tasks of the routine to aid in their understanding of the workings of the clock hands in relation to the clock face, the telling of time thereby, and the scheduling of time thereby.

Preferably, the time management device of the present invention, when used for teaching time, comprises a plurality of planning surfaces, formed as cooperatively engageable layers, as a series of surfaces with varying layers included, or the like. An individual is preferably introduced to the device in a form including relatively few elements, such as only a first layer including the first ring, the second ring, and the clock hands. Once the user is familiar with the action of the clock hands and the movement thereof over the planning surface, the individual may preferably be introduced to an additional second layer, either in the form of an overlay, such as a transparent overlay, or a separate device including both the first and the second layers formed thereon. Such a second layer preferably includes clock numbers and hour dividers in at least one of the first ring and the second ring. The next step is to progress with the introduction of a third layer, again adding additional elements to the planning surface. Such progression enables the step-wise integration of one or more elements of the planning surface at a time to increase an individual's familiarity with the time management device, the skill of telling time by a clock, and the interaction therebetween for planning and time management.

Preferably, additional elements, such as the third and fourth ring, or other indicia such as tidal information, lunar phases, seasons, or the like, may be included in order to familiarize the individual with natural temporal concepts, such as the week, the month, the year, or the like. Preferably, these concepts may similarly be used to relate to other temporal concepts, such as a syllabus, testing schedule, school year, or the like. The opposite may also be implemented, where the individual's familiarity may be used to aid in teaching natural temporal concepts. The planning surface is preferably employed to facilitate such a connection of concepts, such as by including indicators, such as hands of a clock or the like, to mark the passage of time in relation to an area on the planning surface bearing one or more marks corresponding to events and/or tasks. In one example, a test scheduled at the end of the month may be related to the movement of a hand of a clock that indicates the date. As the days go by, the hand progresses closer to the area including the mark corresponding to the test. Thus, one or more user may appreciate an amount of time between the present and the scheduled test.

Now referring to FIGS. 8-14, time management device 100 may alternatively be formed as pad 810 comprising a plurality of sheets of paper. Each sheet preferably comprises planning surface 811 including first ring 812, second ring 813, indicia 814, dividers 821, 822, clock face numbers 823. Pad 810 preferably further includes notation areas 880, such as task area 881 and/or email/call area 882, for recording and tracking one or more task, phone call, or email. Coals/To-Do area 883 may be included in addition to, or in the place of, one or more notation area 880. First and second rings 812, 813 are formed as ovals, oriented with a major axis thereof aligned with the 3 and the 9 of a clock face, but alternative forms and/or orientations are contemplated.

Alternatively, pad 810 may comprise planning surface 811 including first ring 812, second ring 813, day dividers 824, email/call area 882, and goals/to-do area 883. Planning surface 811 may further include day and date area 884 such as disposed centrally within first ring 812 or disposed proximate a no periphery of planning surface 811. Alternatively, cut-out 885 may be included proximate center 811a of planning surface 811 for receiving clock 815.

Pad 810 is preferably useable in combination with binder 1400. Binder 1400 preferably securely retains pad 810 therein for use in managing a user's time. Binder 1400 preferably further includes one or more pocket 1410 and articles A disposable therein, such as a calendar, a pad of paper, an agenda, business cards, calculator, ruler, marking implements, or the like.

It will be appreciated by one skilled in the art that the time management device of the present invention may be implemented in various forms, not only in the dry-erase board and paper pad forms described above, but also in a similar chalk board form, poster form, magnetic form, desk blotter form, projector transparency form, wrist-watch form, electronic form such as a computer executable software program, or the like. Supplementary devices or components may be included with or proximate the time management device to form a system, such as a ruler, a protractor, a marker, a calculator, or the like. Additionally, such forms of the present invention need not include all features described herein; rather, such features may preferably be selected for inclusion according to the desires of the user, manufacturing considerations, or according to other criteria.

Specifically, all features need not be implemented on a single planning surface. Rather, the planning surface may be formed as a series of layers, which may be added or removed according to similar selection criteria, and, thus, the time management device is preferably adaptable to the needs or desires of one or more users thereof, and may take different forms at different times. For example, elements 112, 113, 114, and or 115 may be formed on a first layer or overlay sheet which may be selectively coupled with the planning surface for use. Similarly, elements 121, 122, and 123 may be formed on a second layer or overlay sheet for use with the planning surface and/or the first layer. Likewise, elements 130 may be formed on yet another layer or overlay sheet which may be coupled with the planning surface, the first layer, and/or the second layer. Elements 140, 150, 160, and 170 may be formed on respective layers and used either with the planning surface alone or with one or more of the other layers. Finally, elements 880 may likewise be used in any combination and/or orientation in association with any form of the planning surface, including any combination of elements thereon.

As will also be understood by one skilled in the art, the planning surface and/or the closed loop path according to the present invention may comprise ovoid forms, peanut shaped forms, polygonal forms, or other closed loop forms to increase the space given to selected times, such as more intensive task management times, i.e. typically busier times. Additionally, the planning surface and/or the closed loop path may comprise colored areas or sections, patterned areas or sections, lighted areas or sections, areas or sections of various shapes, markings, symbols, or other indicia, patterns comprised thereof, combinations thereof, or the like to distinguish between adjacent times or blocks of times, adjacent portions of a 24-hour period, or other related concepts.

Furthermore, different forms, colors, patterns, etc., may be selected for one or more day of the week, or for one or more series of pads so as to accommodate a user's scheduling needs: such as a user who regularly works primarily outside conventional business hours, such as the night shift or on a rotation, such as a doctor, or simply to accommodate variations in a user's schedule based on the day of the week, such as the variations between weekdays and weekend days. In one, perhaps most simplified form, the path comprises a single closed loop line, such as a circle, leaving the user to discover or create a preferred assignment of areas of the planning surface to particular blocks of time, or to allow flexibility based on a user's unique or changing needs, whereby the user can mark selected areas on the surface and relate such hours to the passage of time.

In another embodiment, the path may be formed as a figure-8 disposed centrally on the planning surface. What will be understood from these alternative examples is the flexibility of the forms taken by the planning surface, the path thereabout, and/or the number, type, and/or position of the planning elements while remaining within the scope of the invention.

In another embodiment, the path may be formed as part of a computer executable program product, wherein the planning surface and/or the path may be a display on a monitor or other visual projection. As such, the planning surface need not be limited to a two-dimensional surface, and may be perceived and understood as a continuous path that extends in a third dimension. Specifically a helical path and/or planning surface may be employed. Furthermore, the characteristics of the planning surface, the path, and/or other elements of the time management software and/or device may be altered dynamically, such as with the passage of time.

As a further example of the breadth of the invention, the clock may be an actual analog clock arranged such that the hands thereof travel over the planning surface and indicate by pointing the corresponding time block area, and the associated event and/or task marked therein. Alternatively, the clock may take the form of a digital clock that lacks arms, but nonetheless conveys the current time to a user, whereby the user may look to a corresponding area of the planning surface, such as an area disposed where the hour hand would typically be at the current time. Yet another alternative would be an indication of the time without a clock, and having some other indicating means for indicating the area of the planning surface corresponding to the current time, such as a laser pointer or other illumination of the corresponding area, an audible indication, or the like. Furthermore, the indication may take place entirely in the mind of a user, such as a virtual mapping of a clock hand or other indicating technique, such as those described above.

Having, thus, described exemplary embodiments of the present invention, it should be noted by those skilled in the art that the within disclosures are exemplary only and that various other alternatives, adaptations, and modifications may be made within the scope and spirit of the present invention. Furthermore, without departing from the scope of the present invention, the methods, and steps thereof, described herein may be ordered other than as listed above and/or may include alternative steps, additional steps, or any combination or permutation of the enumerated steps. Accordingly, the present invention is not limited to the specific embodiments as illustrated herein, but is only limited by the following claims.

What is claimed is:

1. A time management device comprising:
a planning surface having a pair of rings mapped thereon defining two 360 degree paths around a center of said planning surface, wherein the two 360 degree paths are defined to correlate to a 720 degree rotation of an hour hand of a clock about the pair of rings, a first 360 degree path representative of the 12 AM hours of the day, and a second 360 degree path representative of the 12 PM hours of the day;
a 24-hour closed loop path mapped upon the planning surface to define a rotation around the first 360 degree path and the second 360 degree path;
wherein the planning surface is flat, planar and non-rotating;
wherein the planning surface comprises a printed material configured to be written and drawn upon, thereby configured to record a plurality of data; and
at least one interchangeable transparent dry-erase overlay sheet extending over the planar planning surface in whole and having at least one directional arrow and having a first traverse, interrelated to the 24-hour closed loop path, from the first 360 degree path to the second 360 degree path at a traverse point thereby representative of a change from darkness to daylight, and having a second traverse from the second 360 degree path to the first 360 degree path at the traverse point thereby representative of a change from daylight to darkness, cooperatively engageable with said planning surface, and having at least one additional feature thereon, said at least one additional feature being selected from the group consisting of clock face numbers, radial dividers, angle indications, a line tracing said closed-loop path, an indication of a date, an indication of a day of the week, a clock, and hands of a clock, said at least one transparent dry-erase overlay sheet cooperatively engageable with said planning surface to add said at least one additional feature to said planning surface.

2. The time management device of claim 1, wherein said pair of rings comprises a first ring defining an area radially-inward of a division encircling said center and a second ring defining an area radially-outward of said division.

3. The time management device of claim 1 wherein said pair of rings comprises a first inner loop encompassing said center, and a second outer loop generally concentric therewith, wherein the first inner loop defines a path representative of the 12 AM hours of the day, and wherein the second outer loop defines a path representative of the 12 PM hours of the day.

4. The time management device of claim 3, wherein a first portion of said first inner loop comprises a marking of a first type, wherein a first portion of said second outer loop comprises a marking of the first type, and wherein said first portion of said first inner loop joins said first portion of said second outer loop.

5. The time management device of claim 4, wherein a second portion of said first inner loop comprises a marking of a second type, wherein a second portion of said second outer loop comprises a marking of the second type, and wherein said second portion of said first inner loop joins said second portion of said second outer loop.

6. The time management device of claim 5, wherein said first portion of said inner loop joins said second portion of said inner loop, and wherein said first portion of said outer loop joins said second portion of said outer loop.

7. The time management device of claim 1, further comprising a plurality of dividers extending generally radially from said center.

8. The time management device of claim 7, wherein at least one of said dividers intersects at least a portion of said pair of rings at two separate locations.

9. The time management device of claim 7, wherein said plurality of dividers comprises twenty four dividers defining twenty four areas of said planning surface.

10. The time management device of claim 1, further comprising a clock disposed generally centrally on said planning surface.

11. The time management device of claim 10, further comprising indicia formed on said planning surface, said indicia comprising numbers of a clock face.

12. The time management device of claim 1, further comprising a 360 degree ring comprising 31 sections disposed on said planning surface and encircling said center.

13. The time management device of claim 12, wherein each of said 31 sections comprises indicia corresponding to at least one of a date and a day of the week.

14. The time management device of claim 1, wherein said planning surface comprises at least one of a dry-erase surface, a paper surface, a magnetic surface, and a transparent dry-erase overlay sheet.

15. The time management device of claim 1 further comprising a planning overlay having a pair of rings mapped thereon defining two 360 degree paths around a center of said planning overlay and at least one feature thereon, said at least one feature being selected from the group consisting of clock face numbers, radial dividers, angle indications, a line tracing said closed-loop path, an indication of a date, an indication of a day of the week, a clock, and hands of a clock.

16. A method of teaching time comprising the steps of:
relating each hour of a day with a respective area of a planning surface, said planning surface comprising a pair of rings mapped thereon defining two 360 degree paths around a center of said planning surface, wherein the two 360 degree paths are defined to correlate to a 720 degree rotation of an hour hand of a clock about the pair of rings;
relating a first 360 degree section of said pair of rings to 12 AM hours of the day; and
relating a second 360 degree section of said pair of rings to 12 PM hours of the day;
relating a 24-hour closed loop path mapped upon the planning surface to define a rotation around the first 360 degree path and the second 360 degree path;
wherein the planning surface is flat, planar and non-rotating;
wherein the planning surface comprises a printed material configured to be written and drawn upon, thereby configured to record a plurality of data;
utilizing at least one interchangeable transparent dry-erase overlay sheet extending over the planar planning surface in whole and having at least one directional arrow and having a first traverse, interrelated to the 24-hour closed loop path, from the first 360 degree path to the second 360 degree path at a traverse point thereby representative of a change from darkness to daylight, and having a second traverse from the second 360 degree path to the first 360 degree path at the traverse point thereby representative of a change from daylight to darkness, cooperatively engageable with said planning surface, and having at least one additional feature thereon, said at least one additional feature being selected from the group consisting of clock face numbers, radial dividers, angle indications, a line tracing said closed-loop path, an indication of a date, an indication of a day of the week, a clock, and hands of a clock, said at least one transparent dry-erase overlay sheet cooperatively engageable with said planning surface to add said at least one feature to said planning surface; and
engaging the overlay sheet with the planning surface; and
relating the at least one feature of the overlay sheet to the planning surface.

17. The method of claim 16, further comprising the steps of: relating a third section of said pair of rings to a plurality of day-time hours; and relating a fourth section of said pair of rings to a plurality of night-time hours.

18. The method of claim 16, further comprising the step of demonstrating a 720 degree rotation of an hour hand of a clock about said pair of rings, and correlating said rotation to an activity occurring throughout a day.

19. The method of claim 16, further comprising marking said planning surface to form indicia thereon, said indicia corresponding to at least one occurrence, said occurrence occurring at a scheduled time of the day.

* * * * *